G. A. ARMINGTON.
TRACTOR.
APPLICATION FILED APR. 13, 1915.

1,342,412.

Patented June 8, 1920.
3 SHEETS—SHEET 1.

G. A. ARMINGTON.
TRACTOR.
APPLICATION FILED APR. 13, 1915.

1,342,412.

Patented June 8, 1920.
3 SHEETS—SHEET 3.

INVENTOR,
George A. Armington
By Hull and Smith
ATT'YS.

UNITED STATES PATENT OFFICE.

GEORGE A. ARMINGTON, OF WICKLIFFE, OHIO.

TRACTOR.

1,342,412.   Specification of Letters Patent.   Patented June 8, 1920.

Application filed April 13, 1915. Serial No. 21,158.

*To all whom it may concern:*

Be it known that I, GEORGE A. ARMINGTON, a citizen of the United States, residing at Wickliffe, in the county of Lake and State of Ohio, have invented a certain new and useful Improvement in Tractors, of which the following is a full, clear, and exact description, reference being had to the accompanying drawings.

This invention relates to improvements in tractors, particularly those of the caterpillar or "track laying" type; and it has for its general object the provision of a tractor that is powerful, serviceable, and durable; and that can be very easily controlled and readily turned within the smallest possible radius; and that can be operated over practically all kinds of roads and fields.

Further and more specific objects of the invention are to provide a construction that obviates the transmission of torsional strains to the frame of the tractor, when the traction elements pass over irregularities in the road; and to provide an improved construction for "track laying" tractors wherein the pins which connect the pads or links of the tracks are entirely relieved of weight; and wherein no vibratory or rocking motion is imparted to the tractor through the action of the tracks as the pads thereof pass from the carrying wheels to the ground.

In the embodiment of my invention illustrated and described herein, the power is transmitted from its source to the traction elements through friction gearing, obviating the use of differential mechanism; and suitable brake mechanism is employed for controlling the movements of the vehicle when coasting, thus fulfilling a further object comprehended by my invention, that of providing what may be considered active and passive means for coveniently varying the speed of the tractor and altering the direction of its travel. The means referred to, as will be more fully explained hereinafter, comprise both mechanism for positively transmitting power, at various speeds, from the source of power to the traction elements; and brake mechanism that is used in overcoming the momentum of the vehicle, and also in controlling its speed and direction of travel, when coasting, the latter constituting the passive means above mentioned.

Figure 1:
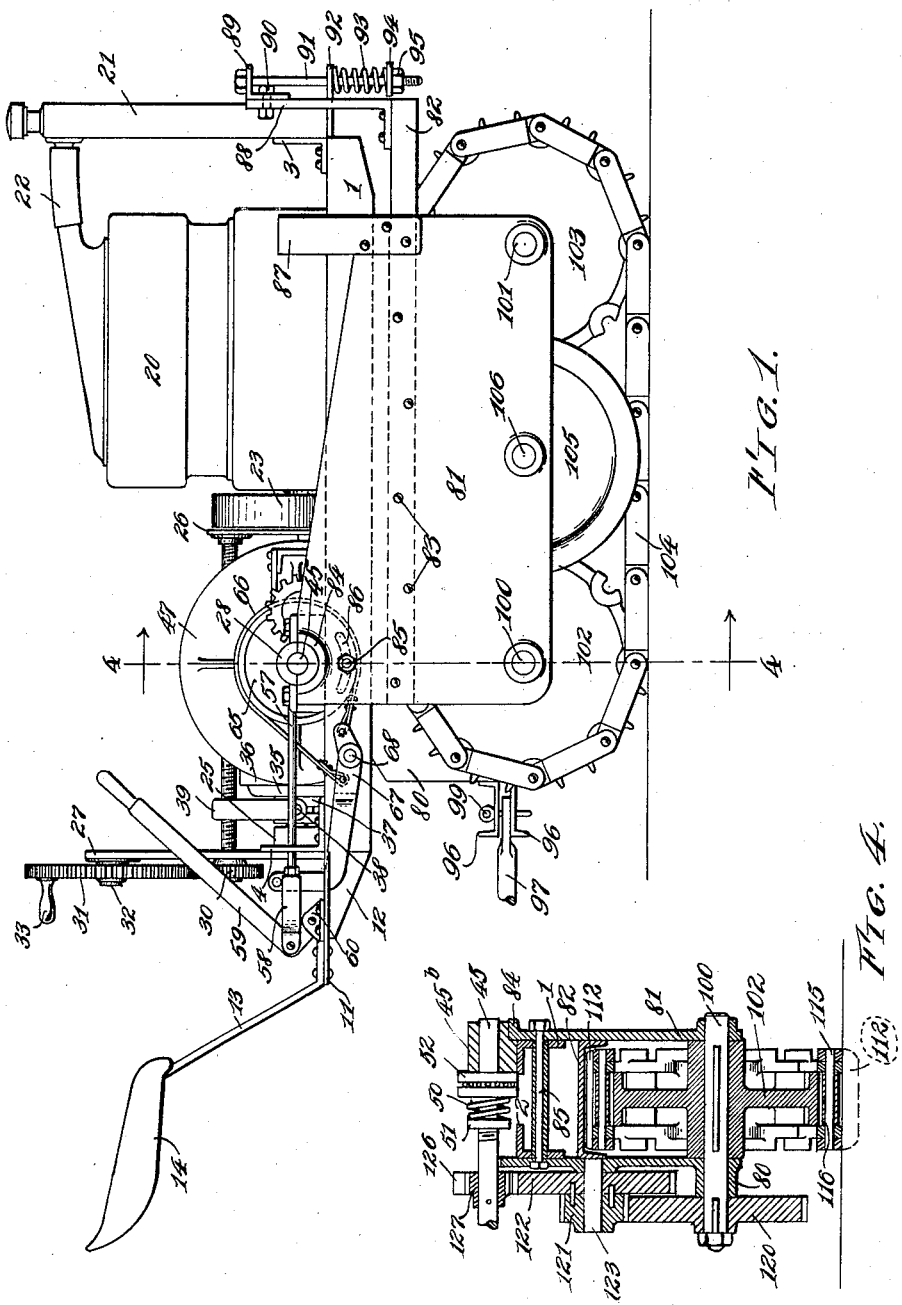
Figure 2:
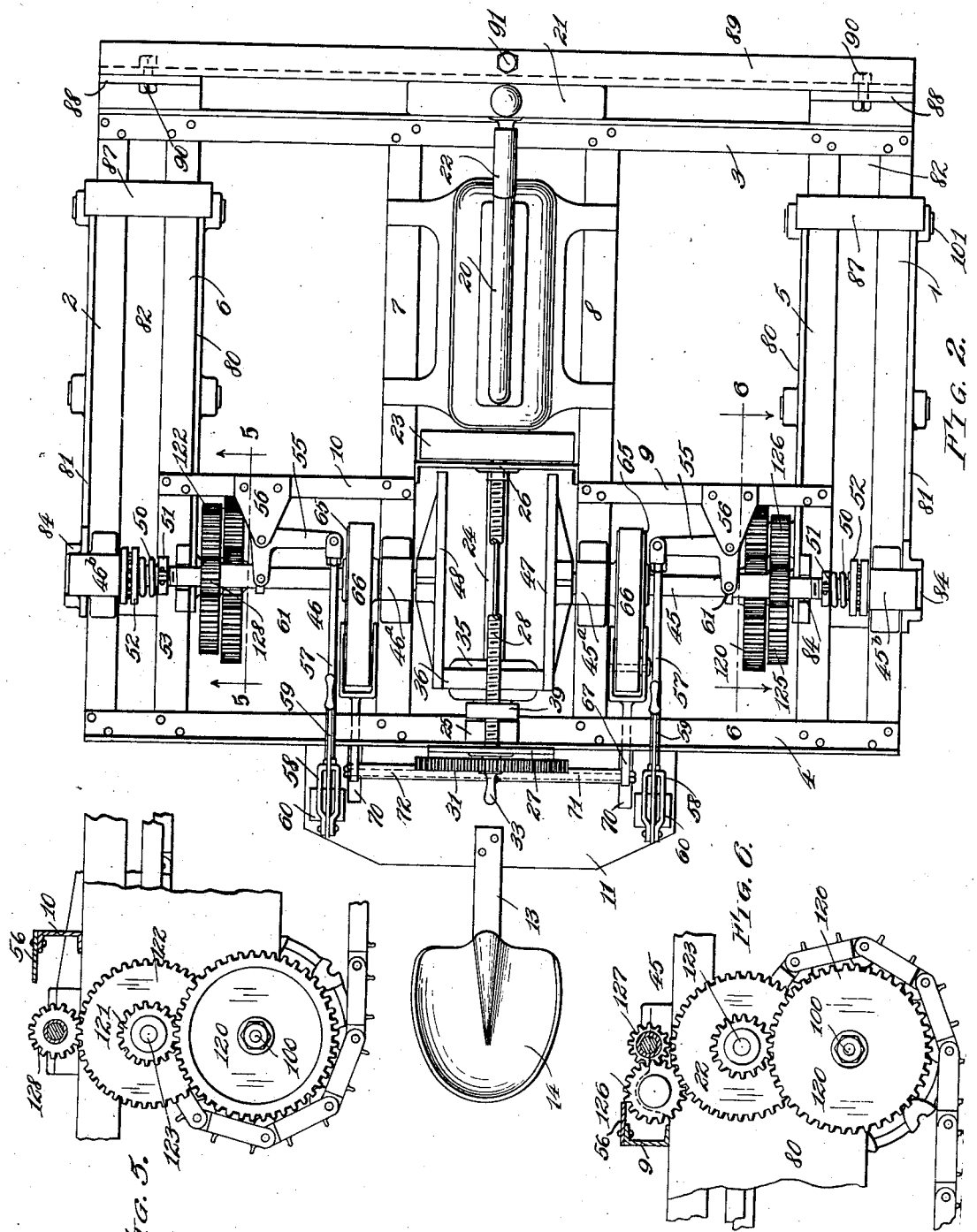
Figure 3:
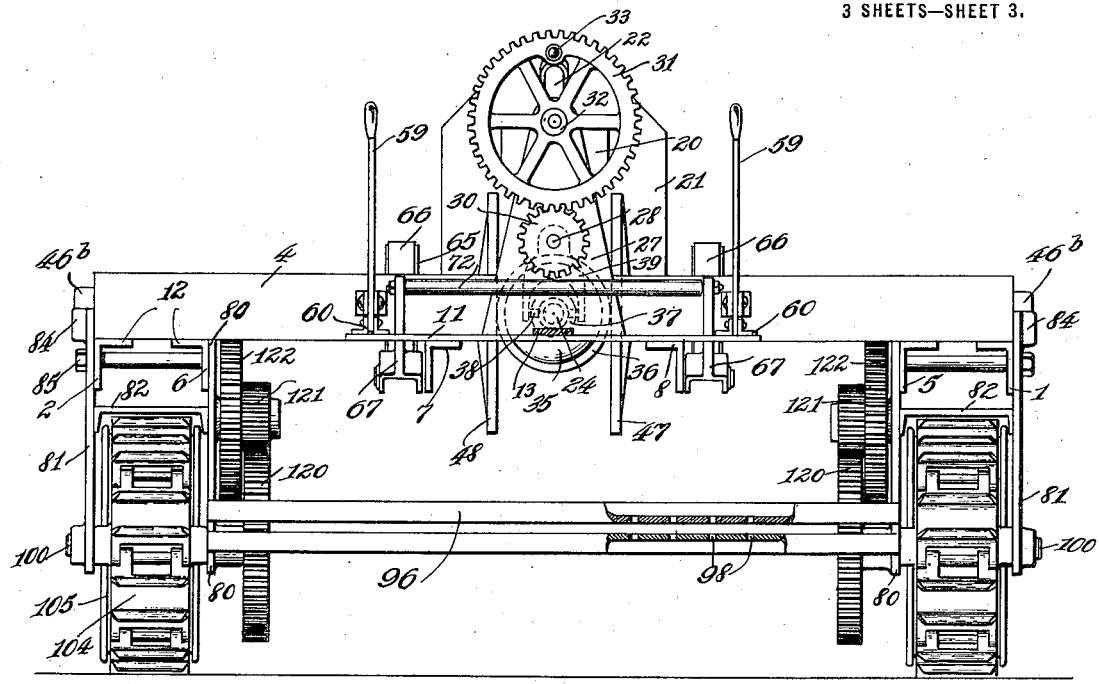
Figures 7, 8, 9:
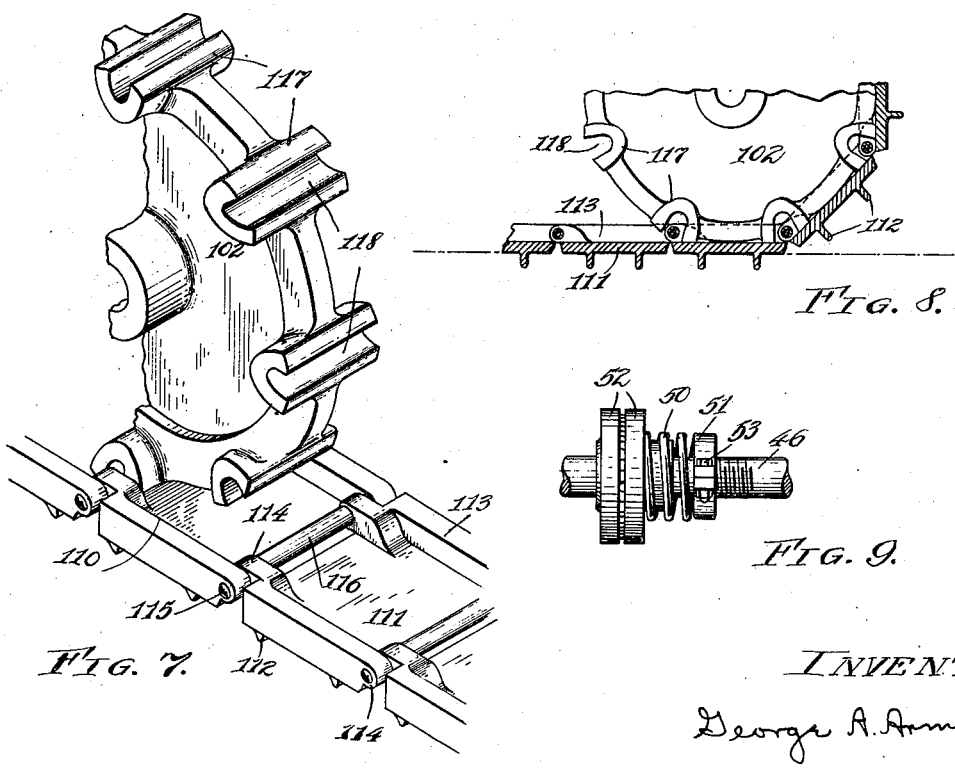

To these ends, and in the attainment of further objects which will become apparent as this description proceeds, I provide a tractor constructed in accordance with the accompanying drawings which form a part of this specification, and while I will necessarily describe the same in detail, I wish to be understood as not limiting myself to the structural details thereof, further than is required by the terms of the annexed claims and is rendered necessary by the state of the prior art. In the drawings, Figure 1 represents a side elevation of my improved tractor; Fig. 2, a plan thereof; and Fig. 3 a rear elevation of the tractor; Fig. 4 is a sectional detail on line 4—4 of Fig. 1; Figs. 5 and 6 are sectional views on the correspondingly numbered lines of Fig. 2; Fig. 7 is a perspective view of a portion of one of the tracks and a fragment of one of the carrying wheels therefor; Fig. 8 is a sectional detail of parts shown in Fig. 7; and Fig. 9 is a detail of the adjusting means for varying the pressure between the driving and driven elements of the friction transmission gearing.

I will now describe the invention in detail by use of reference characters. The frame of the tractor comprises side rails 1 and 2, that are connected at their forward ends by a member 3, and at their rear end by a similar member 4. Members 5 and 6, which are parallel to and spaced a short distance from the respective members 1 and 2, have connection with the transverse members 3 and 4, and a pair of longitudinal members 7 and 8 extend from one to the other of the transverse frame members, and are spaced a slight distance in opposite directions from the longitudinal center of the machine. It will be observed that all of the foregoing members are formed of angle bars, the transverse members 3 and 4 having their vertical flanges extending upward, while the corresponding flanges of the other members extend downward. While I do not restrict myself to this construction, I find it economical, substantial and wholly desirable. Beams 9 and 10 connect, respectively, the frame members 5 and 8 and 6 and 7. A platform 11 is supported from the rear of the frame by brackets 12 which may comprise extensions of the members 7 and 8, and rising from the platform is a post 13, which supports a seat 14 for the operator.

The tractor herein illustrated is driven by an internal combustion engine that is shown conventionally at 20, and is supported by and between the frame members 7 and 8, adjacent the front of the frame. 21 is a radiator that has connection to the water jackets of the engine, through a tube 22. 23 represents the fly wheel of the engine, and 24 the driving shaft, the rear end of which is journaled in a suitable bearing 25, supported on the transverse member 4 of the frame. Journaled within bearings that are carried by the plates 26 and 27 (the former of which is supported by and between the frame members 7 and 8, adjacent the fly wheel 23, and the latter of which rises from the transverse frame member 4), is a threaded shaft 28, that is in vertical alinement with the shaft 24. To the rear of the plate 27, the threaded shaft has a pinion 30 secured to it, which is adapted to be driven by a gear 31, journaled upon a stud 32 that extends from the upper end of the plate 27. The gear 31 has an operating handle 33 that is in convenient reach of the operator as he sits upon the seat 14.

Splined to the shaft 24, is a driving roller 35, having a friction surface 36. This roller has a lateral hub extension 37 that is grooved for coöperation with pins 38 of a fork 39 which embraces said hub extension and has its upper end provided with a threaded aperture through which the shaft 28 operates. From the previous description of the gear 31 and pinion 30, it will be seen that upon rotation of the gear 30, by means of the handle 33, the shaft 28 will be rotated to feed the fork 37 along said shaft, and, through the fork, to move the driving roller 35 along the shaft 24.

Shafts 45 and 46 are supported transversely of the frame, in axial alinement with each other and in the horizontal plane of the shaft 24, by inner and outer bearings which have applied to them the same reference numerals as the respective shafts, augmented by the exponents "a" and "b," respectively. Fastened to the inner end of the shaft 45, is a friction disk 47, and a similar disk 48 is secured to the inner end of the shaft 46. These shafts are moved inward to project their friction disks forcibly against the friction roller 35, by stout springs 50, which are interposed between adjustable collars 51, and thrust bearing 52, that bear against the inner ends of the bearings 45$^b$ and 46$^b$. The collars 51 are threaded upon the shafts 45 and 46, and are split, the end of the collars being held together by bolts 53. This provides a very convenient method of varying the tension of the springs 50, for the bolts 53 may be loosened and the collars adjustable along the shaft until the desired spring tension is obtained, and then the collars may be locked to the shafts by means of said bolts.

55 are bell-cranks that are pivoted to brackets 56, which extend rearward from the beams 9 and 10. The outer ends of the longer branches of the bell-cranks are connected through rods 57 and clevises 58, to the angles of the L shaped levers 59, which have their lower ends pivoted between ears 60 that rise from the platform 11. The free ends of the shorter arms of the bell-cranks 55 are swiveled to collars 61 that are fastened to the shafts 45 and 46. It will be seen, therefore, that, when the operator throws back the levers 59, the shafts 45 and 46 will be moved outward to remove their friction disks from the friction roller 35, against the tension of the springs 50; and attention is called to the fact that the parts may be held in such position by reason of the fact that, when the levers 59 are in their extreme rear positions, the pivotal points of the clevises 58 are below the centers whereon said levers are pivoted. It is also pointed out that the power of the operator is materially multiplied through the design and arrangement of the levers 59 and the bell-cranks 55, so that the compression of the heavy springs 50 is rendered easy.

Secured to each shaft 45 and 46, adjacent its inner bearing, is a brake drum 65, and a band 66, which surrounds each drum, has one of its ends connected to the extreme end of a lever 67, that is pivoted upon a stud 68, extending from the side of the adjacent frame members 6 and 7; and said band has its opposite end connected to the aforesaid lever on the other side of its pivot from that to which the first mentioned end of the band is connected. The levers 67 extend rearward and upward through slots 70 in the platform 11 and their upper ends are connected by a tie-rod 71, which extends through a tube or pipe 72 that serves to space the ends of the levers apart. It will be explained that the connections between the levers and aforesaid tie-rod, are loose enough to permit one of said levers to be operated entirely independent of the other, or both may be depressed simultaneously by applying the pressure at substantially the center of the rod. As previously explained, these brakes may be used for overcoming the momentum of the tractor, or for controlling its speed, or for steering it, when the tractor is coasting.

Each side of the tractor frame is supported by a truck which comprises generally, a pair of side plates that are rigidly connected together and between which are journaled wheels that carry the tracks. The respective inner and outer side plates of each truck are shown at 80 and 81, and these side plates are spaced apart and securely connected, through an inverted channel member 82, that is fastened to said plates by suitable means, such as rivets 83. The side plates 80 and 81 extend some distance above the channels 82, and are spaced a sufficient distance apart to receive between them, the longitudinal side members 1 and 5, and 2 and 6, of the tractor frame. The rear upper corners of the side plates are provided with semi-circular recesses 84, the recesses of the outer plates 81 receiving the projecting ends of the bearings 45$^b$ and 46$^b$, while the recesses of the inner plate receive the shafts 45 and 46. A trunnion connection is therefore formed between the rear end of the tractor frame, and the trucks. To prevent accidental displacement of the parts which constitute the trunnions, a bolt 85 is passed from one to the other of the side plates of each truck, and through segmental slots 86, formed within the intermediate frame members, and which are substantially concentric to the shafts 45 and 46. The forward ends of the side plates 81 and 82 of each truck are connected by a yoke 87, which extends up and over those frame members that are engaged on opposite sides by said plates. The vertical extent of this yoke is sufficient to allow all movement required between the truck and the frame, but it is of a width that will prevent any appreciable extent of lateral relative movement between the truck and frame. A bracket 88 rises from the forward end of each of the channel members 82, and the upper end of the brackets of the two trucks are connected by an angle bar 89. It will be observed that the connection between each end of the bar 89 and the adjacent bracket 88 is formed by a single bolt 90, whereby said connections are of a pivotal nature. At its middle, the horizontal flange of the bar 89 is perforated for the reception of a bolt 91. A plate 92 projects forward from the front of the tractor frame and is perforated for the passage of the bolt 91 therethrough. This plate rests upon a spring 93 that is supported, in turn, by a washer 94, that may be adjusted along the bolt 91 by a nut 95. From this construction it will be seen that a very flexible connection is made between the frame and the trucks, to allow for suitable relative movement between the trucks, without imparting torsional strains to the frame of the tractor.

It will be seen from Fig. 1 that the inner plates 80 of the trucks extend somewhat farther to the rear than the outer plates, and their rear edges are connected by channel members 96, between which extends a pin 99 to which the end of a draw bar 97 is pivoted, as clearly illustrated. It will be mentioned that the channels 96 are provided with a series of perforations 98 for the reception of the pin 99, so that the draw bar may be connected at any point transversely of the tractor. Also, the draw-bar may be attached to the tractor frame, in any suitable manner, should the nature of the work demand a higher connection than is provided by the channels 96.

Journaled upon shafts 100 and 101, that are mounted within the lower corners of the inner and outer plates 80 and 81 of each truck, are the track carrying wheels 102, and 103, respectively. The track is shown generally at 104, and passes about the outer sides of these wheels, and above and below the bearing wheels 105, that are journaled upon a shaft 106, supported within the side plates 80 and 81, midway between the shafts 100 and 101, the bearing wheels engaging only the sides of the tracks, as will be fully explained presently.

Referring particularly to Figs. 7 and 8, it will be seen that each track 104 is composed of a series of pads 110 that comprise, each, a plate 111, from the traction side of which project ribs 112, and from the lateral edges of which rise bearing ridges or rails 113. The bearing wheels 105 engage these rails and normally support the weight of the vehicle, thereby relieving the track carrying wheels of this burden. The corresponding ends of the rails of all of the pads are provided with apertures, and ears 114 protrude beyond the opposite ends of the pads and have apertures which are arranged in alinement with the apertures of the rails for the reception of pins 115 whereby adjoining pads are connected. It will be observed that the ears 114 are set in from the side rails 113, so as to be received between the rails of the next adjacent pad, and anti-friction rollers 116 are carried by the pins 115, between said ears.

The tread carrying wheels have their peripheries formed with substantially semi-cylindrical transverse bosses 117, that have grooves 118 for the reception of the anti-friction roller 116. The edges of the wheels, between the bosses 117, are reduced in width so as to have only a slight transverse bearing upon the plates 111. Especially from Fig. 8 it will be seen that the depth or radial extent of the grooves 118 is such as will prevent the rollers 116 from coming into engagement with the bottoms of the grooves, thus relieving the pins 115 of all weight. However, the angular extent or cross dimension of the grooves 118, is but little greater than the diameter of the anti-friction roller. Therefore, as the driving wheels operate, there will be practically no lost-motion between the sides of the grooves and the rollers. The advantage of making the edges of the tread carrying wheels narrow, transversely, is that it will prevent the accumulation of dirt and gravel between the engaging surfaces of the wheels and pads, and the elimination of difficulties which would naturally follow such a condition. Being narrow, the treads of the wheels displace any sand or stones which fall into the pads, and the action of the tracks is not affected thereby. Attention is called to the fact that the tracks are of sufficient length to allow the pins 115 to move radially within the grooves 118, so as to permit the pads, as they descend from a wheel and come in contact with the ground, to immediately assume a position parallel with the ground, and thereby cause no rise of the wheel, which would be the case if the pads were held in constant engagement with the peripheries of the wheels, in which case the pads would retain a position tangent to the circumference of the wheel, as they approached the ground, and cause the wheels, and consequently the trucks, to be elevated higher than when the pads were finally resting flat upon the ground.

As shown particularly in Figs. 4, 5 and 6, a spur gear 120 is fastened to the end of the shaft 100, just inside the plates 80 of each truck, and this gear meshes with a pinion 121, which, with a gear 122 that is rigid with said pinion, is journaled upon a stud 123, projecting from the aforesaid plate 80. On the right hand side of the machine (as viewed from the driver's seat,) the gear 122 meshes with an idler pinion 126 which, in turn, coöperates with a pinion 127 that is fastened to the shaft 45. On the left hand side of the machine, however, the gear 122 meshes directly with a pinion 128, on the shaft 46. This difference in gearing between the shafts 45 and 46, and the driving wheels of the tracks, compensates for the difference in direction of rotation imparted to said shafts through their respective disks 47 and 48, from the driving roller 35.

From the foregoing description it will be seen that my invention provides a tractor that can be handled effectually and conveniently under all conditions, and one that may be operated over very uneven surfaces without undue strain or damage to any of its parts, or discomfort to its driver.

Having thus described my invention, what I claim is:—

1. In mechanism of the character set forth, the combination of a friction roller, a disk for coöperation with said roller, a longitudinally movable shaft to one end of which the disk is secured, means for moving the shaft in a direction to thrust the disk against the roller, and mechanism for moving the shaft in opposition to the aforesaid means and comprising a bell-crank that is pivoted to a stationary support and having one of its ends swiveled to the shaft, an L shaped lever that has one of its ends pivoted to a fixed support, and a member connecting the opposite end of the bell-crank to the angle of the L shaped lever, the angle of the lever being movable through a straight line defined by the pivot of the lever and the end of the bell-crank to which the lever is connected.

2. In a vehicle of the character set forth, the combination of a frame, a traction element supporting said frame, a motor carried by the frame, a friction roller operatively connected to the motor, a disk for coöperation with the roller, a longitudinally movable shaft to one end of which the disk is secured, transmission gearing between the shaft and the aforesaid traction element, means for moving the shaft in a direction to thrust the disk against the roller, and mechanism for moving the shaft in opposition to the aforesaid means and comprising a bell-crank that is pivoted to a part of the frame and having one of its ends swiveled to the shaft, an L shaped lever that has one of its ends pivoted to a fixed portion of the frame, and a member connecting the opposite end of the bell-crank to the angle of the L shaped lever, the angle of the lever being movable through a straight line defined by the pivot of the lever and the end of the bell-crank to which the lever is connected.

3. In a vehicle of the character set forth, the combination of a frame, a traction element on each side of the frame, a pair of shafts carried by the frame and rotatable independently of each other, driving connections between each shaft and one of the traction elements, a brake for controlling the operation of each shaft, a lever for actuating each brake, and a substantially rigid member having each of its ends pivotally connected to one of the levers whereby through the medium of said member each brake may be operated independently of the other or both may be operated simultaneously at the same or at relatively varying degrees of pressure.

4. In a vehicle of the character set forth, the combination of a frame, a traction element on each side of the frame, a pair of shafts carried by the frame and rotatable independently of each other, means for driving either or both of said shafts, driving connections between each shaft and one of the traction elements, a brake for each shaft, a lever for actuating each brake, and a substantially rigid member having each of its ends pivotally connected to one of the levers whereby through the medium of said member each brake may be operated independently of the other or both may be operated simultaneously at the same or at relatively varying degrees of pressure.

5. In apparatus of the character set forth, the combination of a driving roller, a disk for coöperation with the periphery thereof, a longitudinally movable shaft to one end of which the disk is secured, a portion of said shaft being threaded, a split collar that is internally threaded for coöperation with the threaded portion of the shaft, means for binding the split collar to the shaft in any adjusted position, a fixed support for the shaft that is spaced from the collar, an anti-friction bearing surrounding the shaft and located adjacent the end of the support, a spring interposed between the anti-friction bearing and the collar for moving the shaft in a direction to thrust the aforesaid disk against the driving roller, and mechanism for moving the shaft in opposition to the spring.

6. In apparatus of the character set forth, the combination of a driving roller, a disk for coöperation with the periphery thereof, a longitudinally movable shaft to one end of which the disk is secured, a portion of said shaft being threaded, a split collar that is internally threaded for coöperation with the threaded portion of the shaft, means for binding the split collar to the shaft in any adjusted position, a fixed abutment having a portion that is opposed to one of the angular faces of the collar, a spring interposed between the aforesaid portion of the abutment and the collar for moving the shaft in a direction to thrust the disk against the driving roller, and mechanism for moving the shaft in opposition to the spring.

7. In mechanism of the character set forth, the combination of a driving and a driven element one of which is movable toward and from the other, a shaft to which one of said elements is connected, said shaft being movable with said element, means for moving the shaft in a direction to present the element carried thereby into operative relation to the other element, and mechanism for moving the shaft in opposition to said means, said mechanism including a pivoted lever and a member pivoted thereto and operatively connected to said shaft, said lever being adapted to swing in one direction to allow the aforesaid means to act and in the opposite direction to a position whereby said means locks said lever in ineffective position.

8. In mechanism of the character set forth, the combination of a driving and a driven element, a longitudinally movable shaft carrying one of said elements and through which the elements may be moved into and out of driving engagement, means tending to move the shaft in a direction to engage the elements, and mechanism for moving the shaft in opposition to the aforesaid means and comprising a pivoted lever, a shifting device operatively connected to the shaft, and connections between the shifting device and a part of said lever, such part being movable a limited distance on one side of the center of oscillation of the lever to restrain the aforesaid means against moving the shaft in a direction to engage the elements, and movable on the other side of said center to free said means.

In testimony whereof, I hereunto affix my signature in the presence of two witnesses.

GEORGE A. ARMINGTON

Witnesses:
BRENNAN B. WEST,
HUGH B. McGILL.